Patented Feb. 25, 1941

2,233,080

UNITED STATES PATENT OFFICE 2,233,080

PROCESS FOR THE PREPARATION OF AN ARYL ETHER

William F. Hester, Drexel Hill, and W E Craig, Philadelphia, Pa., assignors to Röhm & Haas Company, Philadelphia, Pa.

No Drawing. Application May 5, 1939, Serial No. 271,914

5 Claims. (Cl. 260—612)

This invention relates to an improved method of preparing an aryl ether from a phenol and an organic halide. In particular it deals with a method for increasing the yield of aryl ether by the addition of a small amount of dimethyl aniline to the reaction mixture.

The reaction of a phenol and an organic halide has usually been performed in the presence of an alkaline material, such as potassium carbonate or potassium hydroxide, but the reaction under these conditions does not allow the yields which are possible by our improved procedure.

It is the object of this invention to increase the yield of aryl ether from the reaction of a phenol and an organic halide.

It has been found that the addition of a small amount of dimethyl aniline, usually about one-half mol equivalent, to an alkaline mixture of a phenol and a halide causes the reaction between these substances to run more smoothly and with increased yield of the desired product. In general, a phenol or its alkali salt is mixed with an equivalent amount of an organic halide, or a slight excess thereof, with less than one equivalent of dimethyl aniline and a slight excess of alkali. The amount of alkali required depends upon the other materials; if a phenol is used, sufficient alkali is added to be at least equivalent to the halogen from the organic halide; if a phenate is used, at least enough alkali is required to correspond to the excess of halogen. The alkali may be a hydroxide, such as sodium hydroxide or potassium hydroxide, or sodium or potassium carbonate may be used. The alkali may be in an aqueous solution or, if a solid reagent is used, water is added to the mixture to yield an emulsion of the reactants. The mixture is heated with stirring until the reaction is substantially complete. The product is then separated, washed, and purified, if desired, by recrystallization or other suitable method.

The proportions given above are not critical but rather those that have been found to give in general the most economical results. Larger or smaller amounts of dimethyl aniline than one-half equivalent may be used with yields greater than would be obtained without its use.

As an organic halide there may be used an aralkyl halide, such as benzyl chloride or bromide, or an aliphatic halide, such as the alkyl halides, n-butyl chloride, isobutyl chloride, normal-, iso-, and secondary amyl chlorides and bromides, or hydroxy-substituted alkyl halides, such as chlorhydrin, or the unsaturated halides, such as allyl bromide, methallyl chloride, and the like. In general, any halide may be used which is known to be sufficiently stable and reactive to form ethers. The halides which are known to yield unsaturated compounds primarily, instead of ethers, or which are not reactive under these conditions are not of practical importance although yields even in these cases may be slightly improved by the addition of dimethylaniline. An example of a compound which does not give a good yield of ether with a phenol is cyclohexyl bromide.

Typical phenols which may be used in the formation of aryl ethers include phenol, the cresols, the xylenols, the naphthols, the various branched or straight chain aliphatic phenols, such as propyl, isopropyl, allyl, butyl, amyl, hexyl, or octyl; alicyclic phenols, such as cyclohexyl, camphyl, etc. phenols; phenyl phenols, benzyl phenol, as well as the nuclear alkyl, nitro, halogen, amino, alkoxy, acyl, etc. derivatives thereof. These phenols, used as such, or as their alkali salts are reacted to form ethers.

The reaction may be represented by the equation:

$$ArOH + RX + MOH \rightarrow ArOR + MX + H_2O$$

wherein Ar represents an aromatic nucleus and R represents an aralkyl or aliphatic radical, M represents an alkali metal, and X represents a halogen.

Typical products represented by ArOR include

2—$CH_3.C_6H_4O.CH_2.CH_2OH$
$C_6H_5O.C_5H_{11}$ (n—$C_5H_{11}$)
4—$NO_2.C_6H_4O.CH_2$—$C(CH_3)=CH_2$
4—$NO_2.C_6H_4O.CH_2.C_6H_5$
4—Cl—2—$NO_2.C_6H_3O.CH_2.C_6H_5$
2—$CH_3.C_6H_4O.CH_2.C_6H_5$
4—$(CH_3)_3C.C_6H_4O.CH_2.C_6H_5$
2—$C_6H_5.C_6H_4O.CH_2.C_6H_5$
4—$C_6H_5CO.C_6H_4O.CH_2.C_6H_5$
4—$C_2H_5.(CH_3)_2C.C_6H_4O.CH_2.C_6H_5$
4—$Cl.C_6H_4O.CH_2.C_6H_5$
2—$C_6H_{11}.C_6H_4O.CH_2.C_6H_5$
4—$CH_3CONH.C_6H_4O.CH_2.C_6H_5$
2—$CH_2=CH.CH_2.C_6H_4O.CH_2.C_6H_5$
2—$CH_3O.C_6H_4O.CH_2.C_6H_5$
4—$(CH_3)_3C.CH_2(CH_3)_2C.C_6H_4O.CH_2.C_{10}H_7$
4—$(CH_3)_3C.C_6H_4O.CH_2.C_{10}H_{11}$
$C_{10}H_7.O.CH_2.C_6H_5$

In preparing any of these the yield of aromatic ether is significantly increased by the presence of dimethyl aniline in the reaction mixture.

The following examples are given to illustrate our improved method. Variations in procedure apparent to those skilled in the art are permissible.

EXAMPLE 1

*Preparation of $C_6H_5CH_2OC_6H_4NO_2$—4*

A mixture of 3360 g. (14 mols) of 81.8% para-nitro-sodium phenolate dihydrate, 2050 g. (15.4 mols) of benzyl chloride, 848 g. (7 mols) of dimethylaniline, 56 g. (1.4 mols) of sodium hydroxide, in 10 l. of water, was heated on a boiling water bath for 6 hours, with stirring. It was allowed to stand overnight, and then was filtered. The filtrate was neutral to litmus. The cake was ground and washed with 609 cc. (7 mols) of concentrated hydrochloric acid in 3 l. of water, and then with 400 cc. (4.7 mols) of acid in 10 l. of water. The solid was washed twice with 2 l. of methanol, once with 3 l. of petroleum ether (b. p. 60–100° C.) and then recrystallized from isopropanol, using 300 cc. for each 50 g. of solid. The recrystallized product was 2718 g., 82% yield, m. p. 105–106° C., which agrees with the melting point recorded in the literature. When the dimethylaniline was replaced with sodium hydroxide, the yield dropped to 46%.

EXAMPLE 2

Preparation of $C_6H_5CH_2OC_6H_4C_6H_5$—2

A mixture of 2040 g. (12 mols) of orthophenylphenol, 1670 g. (13.2 mols) of benzyl chloride, 530 g. (13.2 mols) of sodium hydroxide, 727 g. (6 mols) of dimethylaniline, in 10 l. of water, was heated to 100° C. and stirred at this temperature for 4 hours. The mixture was allowed to cool overnight and the top aqueous layer was siphoned off. A mixture of 3.5 l. of ethylene dichloride and 3.5 l. of water containing 50 g. of sodium hydroxide was added to the bottom layer and, after stirring, allowed to separate. The bottom layer was washed with 7 l. of water and then three times with 520 cc. (6 mols) of concentrated hydrochloric acid in 3.5 l. of water. The bottom layer was washed three times with 7.1 of water. The ethylene dichloride solution was dried over calcium chloride, concentrated, dissolved in 6.3 l. of methanol, and cooled to 0° C. The crystalline product was filtered off and air-dried. The total weight was 2880 g. of crystalline product, or 82.2% of the theoretical yield, m. p. 42–43° C.

EXAMPLE 3

Preparation of $C_6H_5CH_2OC_6H_4C(CH_3)_3$—4

A mixture of 150 g. (1 mol) of paratertiarybutylphenol, 62 g. (0.5 mol) of dimethylaniline, 139 g. (1.1 mols) of benzyl chloride, 44 g. (1.1 mols) of sodium hydroxide, in 540 cc. of water, was stirred and heated on a boiling water bath for 4 hours. The mixture was rapidly cooled and to it was added 50 cc. (0.5 mol) of concentrated hydrochloric acid. The solid was washed twice by melting in the presence of 0.5 mol of hydrochloric acid in 700 cc. of water, and then washed twice with water. It was recrystallized from 350 cc. of methanol, giving 200 g. or 83% yield. Melting point 64° C.

EXAMPLE 4

Preparation of $4\text{-}NO_2C_6H_4OCH_2C(CH_3)=CH_2$

A reaction mixture consisting of 412 g. (2 mols) of sodium paranitro phenolate, (67.5% paranitro phenol), 199 g. (2.2 mols) of methallyl chloride, 8 g. (0.2 mol) of sodium hydroxide, and 1.6 liters of water was stirred 4.5 hours at reflux temperature (81–96° C.). It was cooled, 500 cc. of ethylene dichloride added and unreacted sodium paranitro phenolate removed by filtration. The organic solution was washed with 500 cc. of 10% alkali, then with water twice and concentrated to give a 38.3% yield of the desired ether. When the reaction was repeated using the same conditions but with the addition of 1 mol of dimethylaniline, which was later washed out of the ethylene dichloride solution with 1.5 liters of 3N HCl, the concentrated product amounted to a 66.5% yield. The purified methallyl paranitrophenyl ether is a crystalline solid melting at 40° C. (from ligroin or methanol) and boiling at 133–137° C. at 1 mm.

In the following table increases in yield are shown for various typical products, synthesized from one mol equivalent of the required phenol, 1.1 mol equivalent of organic halide and 1.1 mol of sodium hydroxide. In one series of experiments no dimethylaniline was used; in the other 0.5 mol equivalent of dimethylaniline (D. M. A.) was used. Temperatures were held at 100° C. in all cases and reacting times were similar (4 hours) except in the case of the last two compounds. Here in the absence of dimethylaniline attempts were made to improve yields by lengthening the periods of heating by 2 to 15 hours.

Comparison of yields without and with catalyst

| Compound | Yields | |
|---|---|---|
| | No D. M. A. | 0.5 m. D. M. A. |
| | Percent | Percent |
| $CH_2=C(CH_3)CH_2O.C_6H_4NO_2$—4 | 38 | 67 |
| $C_6H_5.CH_2O.C_6H_3NO_2$—2.Cl—4 | 48 | 73 |
| $C_6H_5.CH_2O.C_6H_4.C(CH_3)_3$—4 | 71 | 83 |
| $C_6H_5.CH_2O.C_6H_4.C_6H_5$—2 | 30–50 | 82 |
| $C_6H_5.CH_2O.C_6H_4.Cl$—4 | 64 | 81 |

The ethers which are obtainable by our improved process are useful as solvents, insecticides, plasticizers, intermediates for pharmaceuticals, resins, etc.

We claim:

1. In the process of preparing an aromatic ether by reacting in the presence of alkali a phenol and an organic halide selected from the group consisting of aralkyl halides and aliphatic halides, the improvement which comprises adding to a mixture containing alkali, one equivalent of said phenol and about one equivalent of said halide from about one-half to about one equivalent of dimethylaniline and heating the resulting mixture between about 80° C. and about 100° C.

2. In the process of preparing an aromatic ether by reacting in the presence of alkali a phenol and an organic halide selected from the group consisting of aralkyl halides and aliphatic halides, the improvement which comprises adding to the reaction mixture an amount of dimethylaniline equivalent to about half of the phenol and heating the mixture between about 80° C. and about 100° C.

3. In the process of preparing an aromatic ether by reacting in the presence of alkali a phenol and an organic halide selected from the group consisting of aralkyl halides and aliphatic halides, the improvement which comprises adding to the reaction mixture between about one-half and about one equivalent of dimethylaniline on the basis of the phenol and heating the resulting mixture between about 80° C. and about 100° C.

4. In the process of preparing an aromatic ether by reacting in the presence of alkali a phenol and an aralkyl halide, the improvement which comprises adding to the reaction mixture about one-half to one equivalent of dimethylaniline on the basis of the phenol and heating the resulting mixture between about 80° C. and about 100° C.

5. The improvement of claim 4 in which the aralkyl halide is benzyl chloride.

WILLIAM F. HESTER.
W E CRAIG.